United States Patent
Masti et al.

(10) Patent No.: US 11,454,200 B2
(45) Date of Patent: Sep. 27, 2022

(54) FUEL SYSTEM WITH AN ARRANGEMENT WHICH SEALS BETWEEN A FUEL INJECTOR AND A FUEL RAIL SOCKET

(71) Applicant: DELPHI TECHNOLOGIES IP LIMITED, St. Michael (BB)

(72) Inventors: Ravish S. Masti, Karnataka (IN); Christopher M. Cass, Arlington Heights, IL (US); Curtis D. Lamb, West Henrietta, NY (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 16/677,926

(22) Filed: Nov. 8, 2019

(65) Prior Publication Data
US 2021/0140398 A1    May 13, 2021

(51) Int. Cl.
 *F02M 55/00* (2006.01)
 *F16J 15/08* (2006.01)
 *F02M 55/02* (2006.01)
 *F02M 61/14* (2006.01)

(52) U.S. Cl.
 CPC ........ *F02M 55/004* (2013.01); *F02M 55/025* (2013.01); *F02M 61/14* (2013.01); *F16J 15/08* (2013.01)

(58) Field of Classification Search
 CPC .... F02M 55/004; F02M 55/025; F02M 61/14; F16J 15/08
 See application file for complete search history.

(56) References Cited

U.S. PATENT DOCUMENTS

| | | | | |
|---|---|---|---|---|
| 4,384,681 A | * | 5/1983 | Claxton | F02M 51/0678 239/585.5 |
| 5,394,850 A | * | 3/1995 | Murphy | F02M 35/10216 123/470 |
| 6,419,282 B1 | * | 7/2002 | Hornby | F02M 55/004 277/613 |
| 7,976,073 B2 | | 7/2011 | Mannucci et al. | |
| 8,069,842 B2 | * | 12/2011 | Kannan | F02M 61/14 123/470 |

(Continued)

FOREIGN PATENT DOCUMENTS

| | | |
|---|---|---|
| EP | 2905461 A2 | 8/2015 |
| JP | 09280374 A | 10/1997 |
| JP | 10078135 A | 3/1998 |

*Primary Examiner* — Phutthiwat Wongwian
*Assistant Examiner* — Diem T Tran
(74) *Attorney, Agent, or Firm* — Joshua M. Haines

(57) ABSTRACT

A fuel system includes a fuel injector having an inlet conduit extending along an axis, a nozzle opening, and a valve needle which is moveable to selectively permit and prevent flow of fuel from the inlet conduit through the nozzle opening. The inlet conduit has a seal support flange which provides a seal support shoulder which is traverse to the axis. A fuel rail assembly includes a fuel rail having a main fuel passage which receives fuel from a fuel source and a socket having a socket bore extending thereinto from a socket open end such that the socket bore is in fluid communication with the main fuel passage and such that the inlet conduit is received within the socket. A sealing ring which is metallic circumferentially surrounds the inlet conduit within the socket bore such that the sealing ring is compressed between the socket bore and the inlet conduit.

16 Claims, 6 Drawing Sheets

(56) References Cited

U.S. PATENT DOCUMENTS

| | | | |
|---|---|---|---|
| 8,171,917 B2 | 5/2012 | Di Domizio et al. | |
| 8,245,697 B2 | 8/2012 | Biasci et al. | |
| 8,286,612 B2 * | 10/2012 | Biasci | F02M 55/025 |
| | | | 123/470 |
| 8,875,682 B2 | 11/2014 | Di Domizio et al. | |
| 8,905,002 B2 | 12/2014 | Serra et al. | |
| 9,567,961 B2 | 2/2017 | Cass et al. | |
| 9,803,605 B2 | 10/2017 | Serra et al. | |
| 10,197,032 B2 | 2/2019 | Kromer | |
| 2004/0011898 A1 * | 1/2004 | Luft | F02M 51/0671 |
| | | | 239/585.1 |
| 2007/0246016 A1 | 10/2007 | Schelfel et al. | |
| 2008/0296402 A1 * | 12/2008 | Grant | F02M 59/102 |
| | | | 239/89 |
| 2009/0229575 A1 | 9/2009 | Giorgetti et al. | |
| 2009/0308954 A1 * | 12/2009 | Giorgetti | F02M 61/14 |
| | | | 239/569 |
| 2010/0258085 A1 | 10/2010 | Giorgetti et al. | |
| 2014/0231551 A1 | 8/2014 | Serra et al. | |
| 2016/0273501 A1 * | 9/2016 | Cass | F02M 61/14 |
| 2017/0350358 A1 | 12/2017 | Bayer et al. | |

* cited by examiner

FUEL SYSTEM WITH AN ARRANGEMENT WHICH SEALS BETWEEN A FUEL INJECTOR AND A FUEL RAIL SOCKET

TECHNICAL FIELD OF INVENTION

The present invention relates to a fuel system for supplying fuel to a fuel consuming device such as an internal combustion engine; more particularly to such a fuel system which includes a sealing ring which seals a fuel injector to a fuel rail socket; and still more particularly to such a fuel system where the sealing ring is metallic.

BACKGROUND OF INVENTION

Fuel injection systems that deliver fuel to fuel consuming devices, for example internal combustion engines, have been known for many years. In modern internal combustion engines, it is increasingly common to provide fuel injectors which inject fuel, for example gasoline, directly into combustion chambers of the internal combustion engine. These internal combustion engines commonly include multiple combustion chambers, and consequently, each combustion chamber is provided with a respective fuel injector to inject fuel therein. A common conduit, typically referred to as a fuel rail, includes an inlet which receives fuel from a fuel source, such as one or more fuel pumps, and also includes a plurality of outlets, each of which is connected to a respective one of the fuel injectors.

In one known arrangement shown in United States Patent Application Publication No. US 2017/0350358 to Bayer et al., the fuel injector is received within a stepped bore of a cylinder head of the internal combustion engine. The stepped bore includes a shoulder which axially supports the fuel injector such that an intermediate member or an isolator may be axially positioned between the fuel injector and the shoulder. An inlet end of the fuel injector is received within a connecting pipe of the fuel rail in order for the fuel injector to receive fuel from the fuel rail. A hold-down device in the form of a spring clip is provided between the connecting pipe and the fuel injector such that the hold-down device urges, and holds, the fuel injector into place against the shoulder of the stepped bore of the cylinder head. In order to seal the connection between the connecting pipe and the inlet end of the fuel injector, an elastomeric O-ring is placed radially between the connecting pipe and the inlet end of the fuel injector. Due to the high fuel pressure exerted on the elastomeric O-ring, a backup ring is included to provide axial support to the elastomeric O-ring, thereby minimizing the likelihood of the elastomeric O-ring being extruded due to the high fuel pressures. However, degradation of the elastomeric O-ring may occur due to extreme pressures, i.e. greater than 35 MPa, and extreme temperature operating range, i.e. −40° C. to 200° C. Furthermore, the elastomeric O-ring is susceptible to cuts, cracks, splits, abrasion, and wear during manufacture, assembly, and operation which may provide undesirable performance.

What is needed is a fuel system which minimizes or eliminates one or more of the shortcomings set forth above.

SUMMARY OF THE INVENTION

Briefly described, a fuel system is provided for supplying fuel to a fuel consuming device. The fuel system includes a fuel injector having a fuel injector inlet conduit extending along an axis, a nozzle opening, and a valve needle which is moveable to selectively permit and prevent flow of fuel from the fuel injector inlet conduit through the nozzle opening, the fuel injector inlet conduit having a fuel injector inlet conduit seal support flange extending radially outward therefrom, thereby proving a seal support shoulder which is traverse to the axis; a fuel rail assembly comprising 1) a fuel rail having a main fuel passage defined therein which is configured to receive fuel from a fuel source and 2) a fuel rail socket having a fuel rail socket bore extending thereinto from a fuel rail socket open end such that the fuel rail socket bore is in fluid communication with the main fuel passage and such that the fuel injector inlet conduit is received within the fuel rail socket; and a sealing ring which is metallic and which circumferentially surrounds the fuel injector inlet conduit within the fuel rail socket bore such that the sealing ring is compressed between, and by, the fuel rail socket bore and the fuel injector inlet conduit, thereby sealingly engaging the fuel rail socket bore and the fuel injector inlet conduit and also thereby preventing fuel from passing to the fuel rail socket open end, the sealing ring also engaging the fuel injector inlet conduit seal support flange such that the fuel injector inlet conduit seal support flange axially supports the sealing ring. The fuel system as disclosed herein provides for a more robust seal between the fuel rail socket and the fuel injector without the need to rely on elastomeric seals which are susceptible to cuts, cracks, splits, abrasion, and wear during manufacture, assembly, and use. Furthermore, the fuel system as disclosed herein provides for a robust seal between the fuel rail socket and the fuel injector over a wide operating temperature range, for example, −40° C. to 200° C. Also furthermore, the fuel system as disclosed herein provides for a more robust seal between the fuel rail socket and the fuel injector in gasoline fuel injection systems which are operating at ever-increasing fuel pressures in order to minimize exhaust particulate emissions and to improve fuel economy, where these fuel pressures are as high as 50-60 MPa and beyond.

BRIEF DESCRIPTION OF DRAWINGS

This invention will be further described with reference to the accompanying drawings in which.

DETAILED DESCRIPTION OF INVENTION

Figure 1:
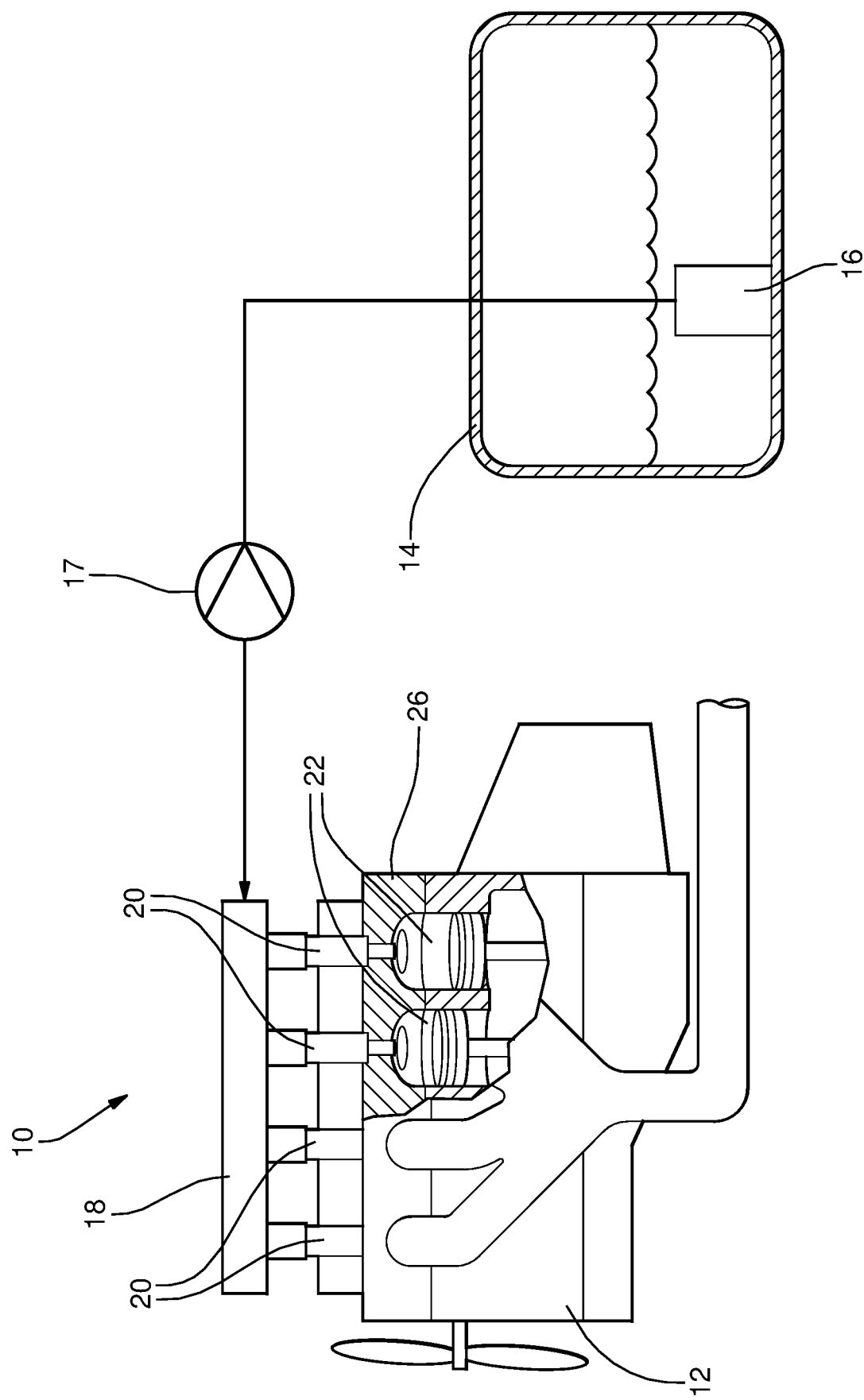
FIG. 1 is a schematic view of a fuel system and internal combustion engine in accordance with the present disclosure.
Figure 2:
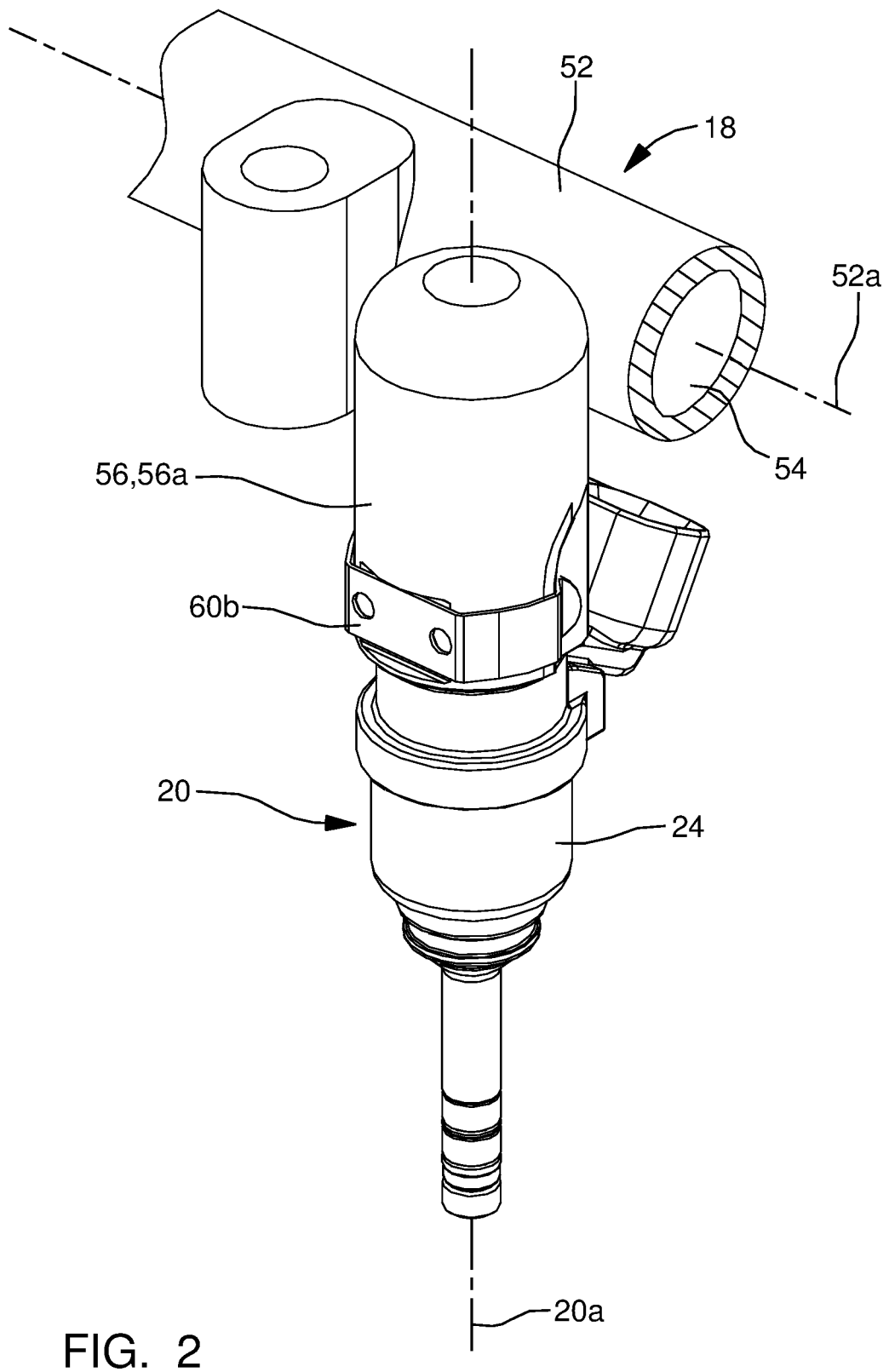
FIG. 2 is an isometric view of the fuel system in accordance with the present disclosure.
Figure 3:
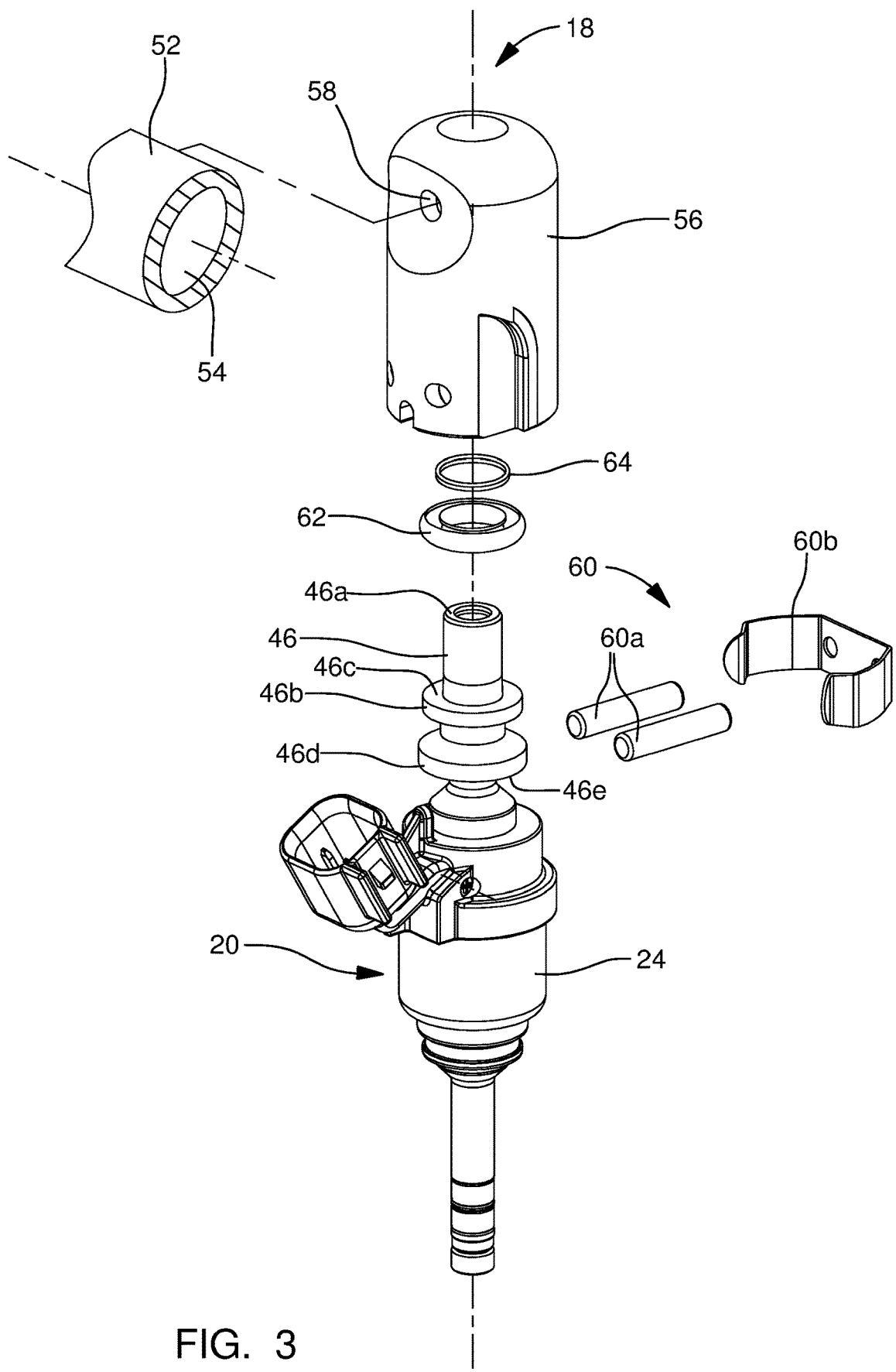
FIG. 3 is an exploded view of FIG. 2.

Referring initially to FIG. 1, a fuel system 10 is shown in simplified schematic form for supplying fuel to a fuel consuming device, for example an internal combustion engine 12, by way of non-limiting example only, for a motor vehicle. Fuel system 10 includes a fuel tank 14 for storing a volume of fuel, a low-pressure fuel pump 16 which may be located within fuel tank 14 as shown, a high-pressure fuel pump 17 which receives fuel from low-pressure fuel pump 16, a fuel rail assembly 18 attached to internal combustion engine 12 and in fluid communication with high-pressure fuel pump 17, and a plurality of fuel injectors 20 in fluid communication with fuel rail assembly 18. In operation, low-pressure fuel pump 16 draws fuel from fuel tank 14 and pumps the fuel to high-pressure fuel pump 17 under relatively low pressure, for example about 500 kPa. High-pressure fuel pump 17, which may be a piston pump operated by a cam of internal combustion engine 12, further pressurizes the fuel and supplies the fuel to fuel rail assembly 18 under relatively high pressure, for example, above about 14 MPa and even reaching 35 MPa or higher. Each fuel injector 20 receives fuel from fuel rail assembly 18 and injects the fuel into a respective combustion chamber 22 of internal combustion engine 12 for combustion of the fuel within combustion chambers 22.

Figure 4:
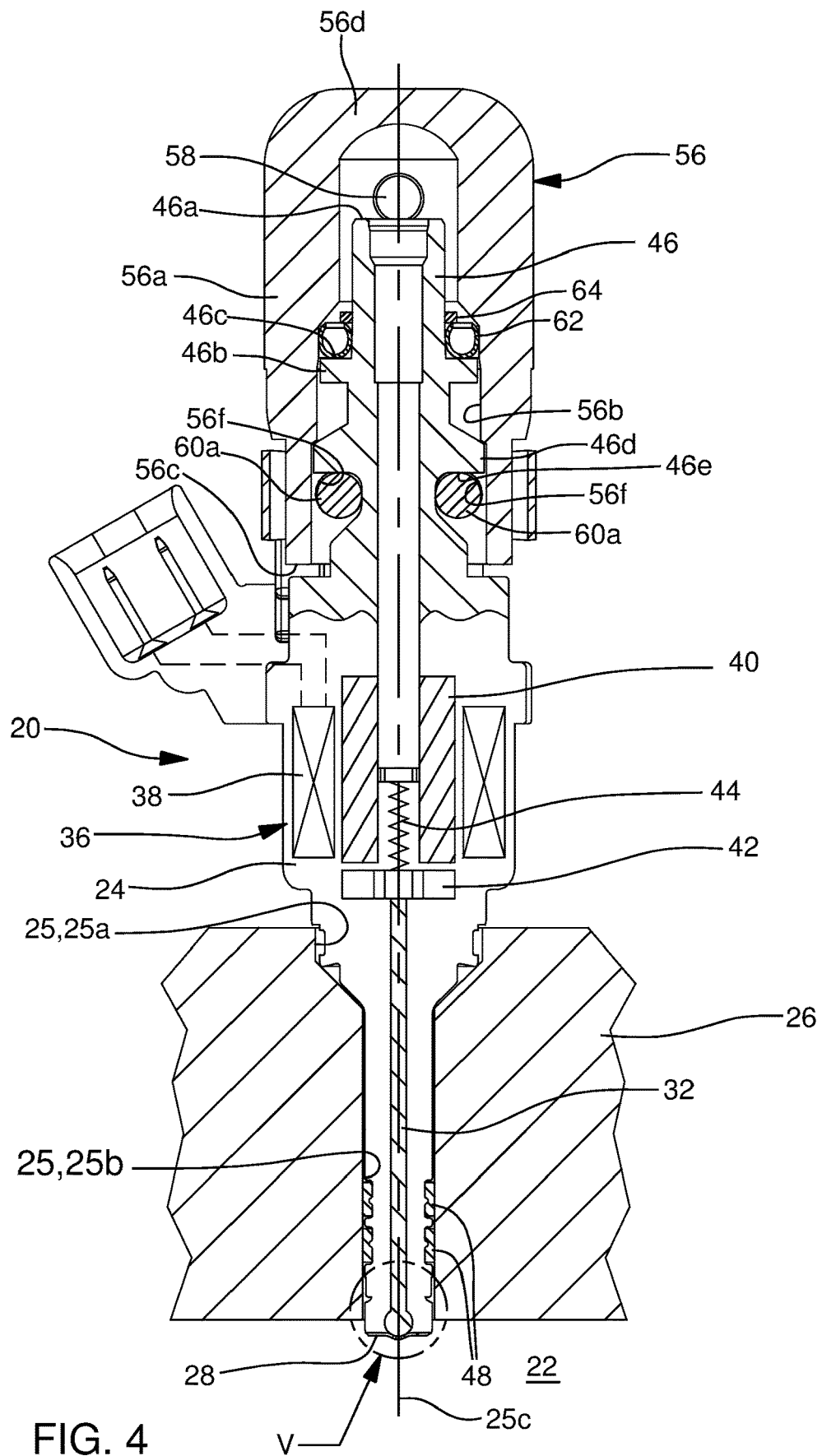
FIG. 4 is an axial cross-sectional view of the fuel system of FIG. 2.
Figure 5:
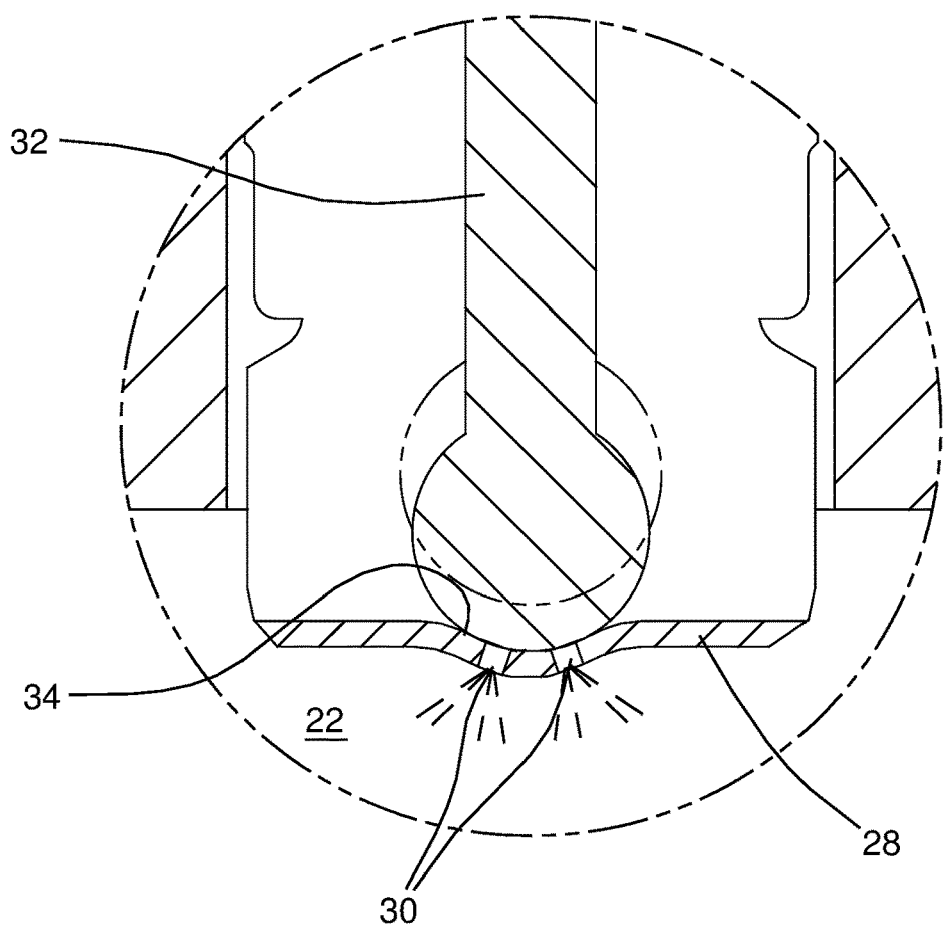
FIG. 5 is an enlarged view of circle V of FIG. 4.

Referring now to FIGS. 4 and 5, fuel injector 20, the internal working of which are shown in schematic form only in FIG. 4, includes a fuel injector body 24 which is configured to be inserted into a fuel injector receiving bore 25 of a cylinder head 26 of internal combustion engine 12 such that a nozzle tip 28 of fuel injector body 24 communicates with combustion chamber 22 and includes one or more nozzle openings 30 therein from which fuel is selectively discharged from fuel injector 20 into combustion chamber 22. The discharge of fuel from nozzle openings 30 is controlled by a valve needle 32 located within fuel injector body 24 where valve needle 32 is selectively seated with a valve seat 34 (valve needle 32 being shown in solid lines in FIG. 5) to stop discharge of fuel through nozzle openings 30 and is selectively unseated with valve seat 34 (valve needle 32 being shown in phantom lines in FIG. 5) to discharge fuel from fuel injector 20 into combustion chamber 22. Movement of valve needle 32 is controlled by an actuator 36, illustrated herein as a solenoid actuator. As embodied herein, actuator 36 includes a wire winding 38, a pole piece 40 which is stationary, an armature 42 which is moveable with valve needle 32, and a return spring 44 which urges valve needle 32 in a direction to be seated with valve seat 34. When wire winding 38 is energized with an electric current, armature 42 is magnetically attracted to pole piece 40, thereby unseating valve needle 32 from valve seat 34. Conversely, when the electric current to wire winding 38 is stopped, the magnetic attraction between armature 42 and pole piece 40 is stopped, thereby allowing return spring 44 to move valve needle 32 to be seated with valve seat 34. While actuator 36 has been illustrated herein as a solenoid actuator, it should be understood that actuator 36 may take other forms, which may be, by way of non-limiting example only, a piezoelectric actuator. Furthermore, while actuator 36 has been illustrated as directly actuating valve needle 32, it should be understood that actuator 36 may be indirectly acting such that the actuator may be used to control fuel pressure in a control chamber such that the fuel pressure in the control chamber affects the position of valve needle 32. Fuel injector 20 includes a fuel injector inlet conduit 46 which extends along a fuel injector axis 20a and which receives fuel from fuel rail assembly 18 for selective injection into combustion chamber 22 such that fuel injector inlet conduit 46 is in fluid communication with fuel rail assembly 18. Fuel injector inlet conduit 46 is made of a metal material, and may preferably be stainless steel in order to minimize or prevent corrosion due to contact with corrosive fuels such as gasoline.

Fuel injector receiving bore 25 is a stepped bore which includes at least two sections of distinct diameter such that a fuel injector receiving bore outer portion 25a is distal from combustion chamber 22 and such that a fuel injector receiving bore inner portion 25b is proximal to combustion chamber 22. Fuel injector receiving bore outer portion 25a and fuel injector receiving bore inner portion 25b are each centered about a fuel injector receiving bore axis 25c, however, fuel injector receiving bore outer portion 25a is larger in diameter than fuel injector receiving bore inner portion 25b. Fuel injector 20 includes one or more combustion seals 48 which are disposed radially between fuel injector body 24 and fuel injector receiving bore inner portion 25b, thereby preventing combustion gases from passing between the interface of fuel injector body 24 and fuel injector receiving bore inner portion 24b.

Fuel injector inlet conduit 46 initiates at a fuel injector inlet conduit inlet end 46a and extends therefrom toward fuel injector body 24. Fuel injector inlet conduit 46 includes a fuel injector inlet conduit seal support flange 46b which extends radially outward therefrom and which is annular in shape. Fuel injector inlet conduit seal support flange 46b provides a seal support shoulder 46c which is traverse to, and preferably perpendicular to, fuel injector axis 20a and which faces toward fuel injector inlet conduit inlet end 46a. Fuel injector inlet conduit 46 also includes a fuel injector inlet conduit retention flange 46d which extends radially outward therefrom and which is annular in shape such that fuel injector inlet conduit retention flange 46d is spaced axially apart from fuel injector inlet conduit seal support flange 46b in a direction away from fuel injector inlet conduit inlet end 46a. Fuel injector inlet conduit retention flange 46d provides a retention shoulder 46e which is traverse to, and preferably perpendicular to, fuel injector axis 20a and which faces away from fuel injector inlet conduit inlet end 46a. While fuel injector inlet conduit seal support flange 46b and fuel injector inlet conduit retention flange 46d have been illustrated herein as separate elements, it should be understood that they may alternatively be a single flange.

Now with reference to FIGS. 2-7, fuel rail assembly 18 includes a fuel rail 52 which extends along a fuel rail axis 52a and which is tubular, thereby defining a fuel rail main fuel passage 54 therein which receives high-pressure fuel from high-pressure fuel pump 17. Fuel rail assembly 18 also includes a plurality of fuel rail sockets 56 (only one of which is shown) which each receive a respective one of fuel injectors 20. Each fuel rail socket 56 may be substantially the same, and consequently, one fuel rail socket 56 and respective elements interfacing therewith for making connection to a respective fuel injector 20 will be referred to in singular form with the understanding that the description applies equally to the connection to each fuel injector 20.

Fuel rail socket 56 has a fuel rail socket body 56a with a fuel rail socket bore 56b extending thereinto from a fuel rail socket open end 56c to a fuel rail socket closed end 56d. The portion of fuel rail socket bore 56b which is proximal to fuel rail socket closed end 56d is in fluid communication with, and receives fuel from, fuel rail main fuel passage 54 by way of a connecting passage 58 which extends from fuel rail main fuel passage 54 to fuel rail socket bore 56b. Fuel rail socket bore 56b is centered about, and extends along a fuel rail socket bore axis 56e, which may nominally be coincident with fuel injector axis 20a, but may be angulated or laterally offset relative to fuel injector axis 20a due to manufacturing variations.

Fuel injector inlet conduit 46 is received within fuel rail socket bore 56b in order to supply fuel to fuel injector 20. In order to retain fuel injector inlet conduit 46 within fuel rail socket bore 56b, fuel rail socket body 56a includes fuel rail socket retention bores 56f which extend therethrough such that fuel rail socket retention bores 56f intersect with fuel rail socket bore 56b. Fuel rail socket retention bores 56f are traverse to, and preferably perpendicular to, fuel rail socket bore axis 56e such that fuel rail socket retention bores 56f are each laterally offset from, and separated from each other by, fuel rail socket bore axis 56e and such that fuel rail socket retention bores 56f are preferably parallel to each other.

A retention arrangement 60 which may include a pair of retention pins 60a and a retention pin retainer 60b, is included to retain fuel injector inlet conduit 46 within fuel rail socket bore 56b. Retention pins 60a may be simple cylinders such that each retention pin 60a is received in a respective fuel rail socket retention bore 56f such that fuel injector inlet conduit retention flange 46d is located axially between retention pins 60a and fuel rail socket closed end 56d. Retention pin retainer 60b clips onto the outer periphery of fuel rail socket body 56a, thereby blocking fuel rail socket retention bores 56f and preventing retention pins 60a from being removed therefrom. In this way, movement of fuel injector inlet conduit 46 in a direction from within fuel rail socket bore 56b toward fuel rail socket open end 56c is limited by retention shoulder 46e abutting retention pins 60a, thereby retaining fuel injector 20 to fuel rail assembly 18. Further details of retention arrangement 60 are provided in U.S. Pat. No. 9,567,961 to Cass et al., the disclosure of which is incorporated herein by reference in its entirety. Alternatives to retention arrangement 60 are known to those of ordinary skill in the art, some of which are shown in Cass et al.

In order to seal fuel injector inlet conduit 46 to fuel rail socket bore 56b, thereby preventing fuel from passing through fuel rail socket open end 56c except by passing through fuel injector 20, fuel rail assembly 18 also includes a sealing ring 62 which is located within fuel rail socket bore 56b and which circumferentially surrounds fuel injector inlet conduit 46 at a location between fuel injector inlet conduit inlet end 46a and fuel injector inlet conduit seal support flange 46b. Sealing ring 62 is made of a metal material, and may preferably be stainless steel in order to minimize or prevent corrosion due to contact with corrosive fuels such as gasoline. In order to ensure proper sealing, sealing ring 62 is sized to be compressed radially, i.e. perpendicular to fuel rail socket bore axis 56e where the compression is preferably elastic. As a result, sealing ring 62 is sized to be an interference fit with the portion of fuel injector inlet conduit 46 which is adjacent to seal support shoulder 46c. However, fuel injector inlet conduit 46 preferably tapers to a smaller diameter at fuel injector inlet conduit inlet end 46a which is not an interference fit with sealing ring 62 when sealing ring 62 is positioned such that all of sealing ring 62 circumferentially surrounds fuel injector inlet conduit 46, thereby allowing sealing ring 62 to be easily installed. It is important to emphasize that at no point, in a direction from seal support shoulder 46c to fuel injector inlet conduit inlet end 46a, does fuel injector inlet conduit 46 increase in diameter. Also as a result, sealing ring 62 is sized to be an interference fit with the portion of fuel rail socket bore 56b which circumferentially surrounds the portion of fuel injector inlet conduit 46 which is adjacent to seal support shoulder 46c. However, fuel rail socket bore 56b preferably tapers to a larger diameter, in a direction toward fuel rail socket open end 56c, which is not an interference fit with sealing ring 62, thereby allowing sealing ring 62 to be easily installed. It is important to emphasize that at no point, in a direction from where sealing ring 62 engages fuel rail socket bore 56b to fuel rail socket open end 56c, does fuel rail socket bore 56b decrease in diameter.

Figure 7:
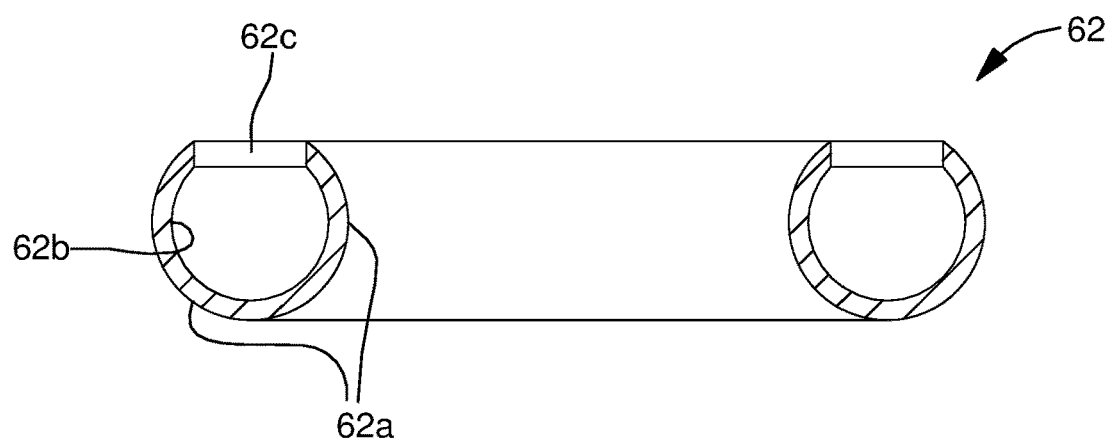
FIG. 7 is an enlarged cross-sectional view of a sealing ring of the fuel system.
Figure 6:
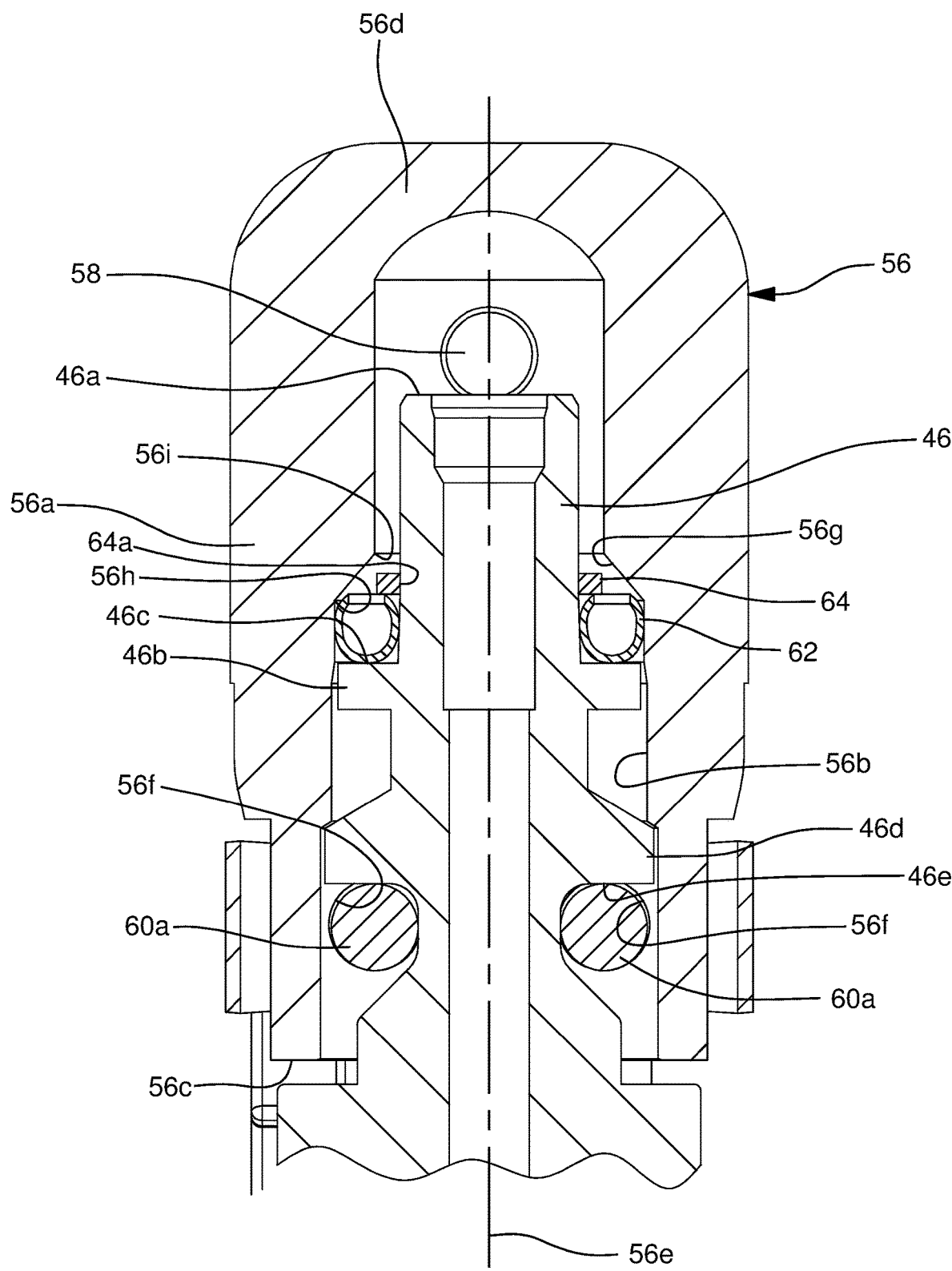
FIG. 6 is an enlarged portion of 4.

Sealing ring 62 may be hollow as shown, thereby sealing ring 62 being a hollow toroid having a sealing ring outer surface 62a and a sealing ring inner surface 62b. Also as shown, sealing ring 62 may include a sealing ring slot 62c extending from sealing ring outer surface 62a to sealing ring inner surface 62b such that sealing ring slot 62c is annular in shape and centered about fuel rail socket bore axis 56e. Sealing ring 62 may be referred to as a C-ring as a result of the axial cross-sectional shape of sealing ring 62 at one radial location being in the shape of a "C" as shown in FIGS. 4, 6, and 7. Sealing ring slot 62c is oriented within fuel rail socket bore 56b to be in fluid communication with connecting passage 58. Consequently, pressurized fuel is able to act on the interior of sealing ring 62 which causes forces which tend to expand sealing ring 62, thereby further enhancing sealing between sealing ring 62 and fuel rail socket 56 and between sealing ring 62 and fuel injector inlet conduit 46. As illustrated herein, sealing ring slot 62c may be oriented on sealing ring 62 to be opposed to seal support shoulder 46c. In an alternative arrangement, sealing ring 62 may be solid, rather than hollow, while still being configured to elastically deform in a similar manner to sealing ring 62 which is hollow. However, when sealing ring 62 is solid, there is no internal volume to receive pressurized fuel that may be used to expand sealing ring 62 to enhance sealing. In yet another alternative, sealing ring 62 may remain hollow, but sealing ring slot 62c may be omitted, thereby forming a sealed chamber therein. In still yet another alternative, sealing ring 62 may include a spring within the hollow interior defined by sealing ring inner surface 62b. This spring adds to the force directed outward when compressed, thereby further enhancing sealing between sealing ring 62 and fuel rail socket 56 and between sealing ring 62 and fuel injector inlet conduit 46. Other configurations of metallic sealing rings are also anticipated, for example, metallic E-rings or metallic U-rings.

In order to limit the extent to which sealing ring 62 can be inserted into fuel rail socket bore 56b, a fuel rail socket bore stop surface 56g is provided on fuel rail socket bore 56b such that fuel rail socket bore stop surface 56g is located along fuel rail socket bore axis 56e between seal support shoulder 46c and fuel injector inlet conduit inlet end 46a. Fuel rail socket bore stop surface 56g initiates at an inside corner 56h, i.e. a concave corner, which is proximal to fuel rail socket open end 56c and terminates at an outside corner 56i, i.e. a convex corner, which is distal from fuel rail socket open end 56c. Fuel rail socket bore stop surface 56g is axially aligned, i.e. parallel to fuel rail socket bore axis 56e, with sealing ring 62, thereby preventing movement of sealing ring 62 beyond fuel rail socket bore stop surface 56g. While fuel rail socket bore stop surface 56g has been illustrated herein as inclined relative to fuel rail socket bore axis 56e, fuel rail socket bore stop surface 56g may alternatively be perpendicular to fuel rail socket bore axis 56e.

Fuel system 10 may optionally include a sealing ring retention ring 64 which is used to maintain sealing ring 62 in contact with seal support shoulder 46c and to minimize or eliminate movement of sealing ring 62 resulting from vibrations or pressure pulsations during operation since such movement of sealing ring 62 could otherwise provide a less robust seal between sealing ring 62 and fuel injector inlet conduit 46 and between sealing ring 62 and fuel injector socket 56. Sealing ring retention ring 64 is a continuous ring, i.e. completely circumferentially surrounds fuel injector inlet conduit 46, may preferably be metal, such as stainless steel, and includes a sealing ring retention ring inner periphery 64a which is sized to engage fuel injector inlet conduit 46 in an interference fit. Sealing ring retention ring 64 is pressed onto fuel injector inlet conduit 46 after, or simultaneously with, sealing ring 62 until sealing ring 62 is in contact with both sealing ring retention ring 64 and seal support shoulder 46c such that sealing ring 62 is captured axially between sealing ring retention ring 64 and seal support shoulder 46c. Consequently, movement of sealing ring 62 due to vibrations and pressure pulsations during operation is minimized and a robust seal between sealing ring 62 and fuel injector inlet conduit 46 and between sealing ring 62 and fuel injector socket 56 is maintained. While sealing ring retention ring 64 has been illustrated herein as having a rectangular cross-sectional shape, it should be understood that cross-sectional shapes such as circular or trapezoidal may alternatively be utilized to achieve the desired function.

While sealing ring 62 has been illustrated herein as being radially compressed between fuel injector inlet conduit 46 and fuel rail socket 56 to provide sealing, it should be understood that in an alternative, or in addition to, sealing ring 62 may be compressed axially to provide sealing. In such an arrangement, fuel rail socket bore stop surface 56g may preferably be perpendicular to fuel rail socket bore axis 56e and sealing ring slot 62c may need to be oriented to face toward fuel injector inlet conduit 46. Furthermore, spacing between seal support shoulder 46c and fuel rail socket bore stop surface 56g is reduced to cause axial compression of sealing ring 62.

Fuel system 10 as disclosed herein provides for a robust seal between fuel rail socket 56 and fuel injector 20 without the need to rely on elastomeric seals which are susceptible to cuts, cracks, splits, abrasion, and wear during manufacture, assembly, and use.

While the invention has been described by reference to various specific embodiments, it should be understood that numerous changes may be made within the spirit and scope of the inventive concepts described. Accordingly, it is intended that the invention not be limited to the described embodiments, but rather only to the extent set forth in the claims that follow.

We claim:

1. A fuel system for supplying fuel to a fuel consuming device, said fuel system comprising:
    a fuel injector having a fuel injector inlet conduit extending along an axis, a nozzle opening, and a valve needle which is moveable to selectively permit and prevent flow of fuel from said fuel injector inlet conduit through said nozzle opening, said fuel injector inlet conduit having a fuel injector inlet conduit seal support flange extending radially outward therefrom, thereby proving a seal support shoulder which is traverse to said axis;
    a fuel rail assembly comprising 1) a fuel rail having a main fuel passage defined therein which is configured to receive fuel from a fuel source and 2) a fuel rail socket having a fuel rail socket bore extending thereinto from a fuel rail socket open end such that said fuel rail socket bore is in fluid communication with said main fuel passage and such that said fuel injector inlet conduit is received within said fuel rail socket; and
    a sealing ring which is metallic and which circumferentially surrounds said fuel injector inlet conduit within said fuel rail socket bore such that said sealing ring is compressed between, and by, said fuel rail socket bore and said fuel injector inlet conduit, thereby sealingly engaging said fuel rail socket bore and said fuel injector inlet conduit and also thereby preventing fuel from passing to said fuel rail socket open end, said sealing ring also engaging said fuel injector inlet conduit seal support flange such that said fuel injector inlet conduit seal support flange axially supports said sealing ring.

2. The fuel system as in claim 1, wherein said sealing ring is a hollow toroid having an outer surface and an inner surface and a slot extending from said outer surface to said inner surface such that said slot is annular in shape and centered about said axis and such that said slot provides fluid communication between said main fuel passage and said inner surface.

3. The fuel system as in claim 2, wherein said slot is oriented to be opposed to said fuel injector inlet conduit seal support flange.

4. The fuel system as in claim 1, wherein said fuel injector inlet conduit extends from said seal support shoulder and terminates at a fuel injector inlet conduit inlet end such that at no point, in a direction from said seal support shoulder to said fuel injector inlet conduit inlet end, does said fuel injector inlet conduit increase in diameter.

5. The fuel system as in claim 4, wherein at no point, in a direction from where said sealing ring engages said fuel rail socket bore to said fuel rail socket open end, does said fuel rail socket bore decrease in diameter.

6. The fuel system as in claim 5, wherein said fuel rail socket bore includes a fuel rail socket bore stop surface located along said axis between said seal support shoulder and said fuel injector inlet conduit inlet end which limits how far said sealing ring is inserted into said fuel rail socket bore.

7. The fuel system as in claim 6, wherein said fuel rail socket bore stop surface initiates at an inside corner and terminates at an outside corner such that said inside corner is proximal to said fuel rail socket open and such that said outside corner is distal from said fuel rail socket open end.

8. The fuel system as in claim 7, wherein said fuel rail socket bore stop surface is axially aligned with said sealing ring.

9. The fuel system as in claim 1, wherein said fuel rail socket bore includes a fuel rail socket bore stop surface located along said axis between said seal support shoulder and said fuel injector inlet conduit inlet end which limits how far said sealing ring is inserted into said fuel rail socket bore.

10. The fuel system as in claim 9, wherein said fuel rail socket bore stop surface initiates at an inside corner and terminates at an outside corner such that said inside corner is proximal to said fuel rail socket open and such that said outside corner is distal from said fuel rail socket open end.

11. The fuel system as in claim 10, wherein said fuel rail socket bore stop surface is axially aligned with said sealing ring.

12. The fuel system as in claim 1, wherein at no point, in a direction from where said sealing ring engages said fuel rail socket bore to said fuel rail socket open end, does said fuel rail socket bore decrease in diameter.

13. The fuel system as in claim 1, wherein said sealing ring is compressed radially between, and by, said fuel rail socket bore and said fuel injector inlet conduit.

14. The fuel system as in claim 1, wherein said fuel injector inlet conduit extends from said seal support shoulder and terminates at a fuel injector inlet conduit inlet end such that said sealing ring is sized to be an interference fit with said fuel injector inlet conduit when said sealing ring engages said seal support shoulder and such that said sealing ring is sized to not be an interference fit with said fuel injector inlet conduit when said sealing ring is positioned at said fuel injector inlet conduit inlet end with all of said sealing ring circumferentially surrounding said fuel injector inlet conduit.

15. The fuel system as in claim 1, wherein said fuel system further comprises a sealing ring retention ring which circumferentially surrounds said fuel injector inlet conduit such that said sealing ring is located axially between said seal support shoulder and said sealing ring retention ring and such that said sealing ring is in contact with both said seal support shoulder and said sealing ring retention ring.

16. The fuel system as in claim 15, wherein said sealing ring retention ring includes a sealing ring retention ring inner periphery which engages said fuel injector inlet conduit in an interference fit.

* * * * *